United States Patent Office 2,954,320
Patented Sept. 27, 1960

2,954,320

VINYL PHOSPHATE PESTICIDES

Everett E. Gilbert, Morristown, Alphonso W. Marsilio, Boonton, and Julian A. Otto, Stockholm, N.J., assignors to Allied Chemical Corporation, New York, N.Y., a corporation of New York No Drawing. Filed Dec. 18, 1958, Ser. No. 781,208

18 Claims. (Cl. 167—30)

This invention relates to the production of new vinyl phosphate compounds useful as active pesticidal toxicants.

Accordingly, one object of the invention is to provide new chemical compounds in the form of vinyl phosphates. Another object is to provide a process for the production of the new vinyl phosphate compounds. Still another object is the provision of novel vinyl phosphate compounds for application as pesticides. Other objects and advantages will be apparent hereinafter.

The novel vinyl phosphate compounds of this invention conform to the general formula:

$$\text{RS}-\text{CR}^1=\text{CO}-\overset{\overset{\text{O}}{\|}}{\text{P}}(\text{OR}^2)_2$$
$$\underset{\text{R}^3}{|}$$

in which R is a member of the group consisting of alkyl and monochloroalkyl radicals, preferably lower alkyl and monochloroalkyl radicals, for example, those containing from one to four carbon atoms, $R^1$ is a member of the group consisting of hydrogen and chlorine, $R^2$ is an alkyl radical, preferably a lower alkyl radical, for example, one containing from one to four carbon atoms, and $R^3$ is an aromatic radical of the group consisting of phenyl, naphthyl and substituted derivatives thereof, including halo-, phenyl-, phenoxy-, alkyl- and alkoxy-substituted derivatives.

The vinyl phosphate compounds of the invention are prepared by reacting an acetophenone or acetonaphthone thioalkyl ether with a suitable chlorinating agent, such as sulfuryl chloride, to form a chlorinated acetophenone or acetonaphthone thioalkyl ether, which is then reacted with a trialkyl phosphite to produce the desired vinyl phosphate compound. The equations representing these reactions are as follows:

(1)
$$\text{R}^3\text{S}-\text{CH}_2-\text{COR}^3+(\text{X})\text{SO}_2\text{Cl}_2 \longrightarrow$$
$$\text{RS}-\text{CR}^1\text{Cl}-\text{COR}^3+(\text{X})\text{SO}_2+(\text{X})\text{HCl}$$

(2)
$$\text{RS}-\text{CR}^1\text{Cl}-\text{COR}^3+(\text{OR}^2)_3\text{P} \longrightarrow \text{RS}-\text{CR}^1=\overset{\overset{\text{O}}{\|}}{\text{CO}}-\text{P}(\text{OR}^2)_2+\text{R}_2\text{Cl}$$
$$\underset{\text{R}^3}{|}$$

In the above equations, R is a member of the group consisting of alkyl and monochloroalkyl radicals, $R^1$ is a member of the group consisting of hydrogen and chlorine, $R^2$ is an alkyl radical, and $R^3$ is an aromatic radical of the group consisting of phenyl, naphthyl and substituted derivatives thereof. Further, X represents the degree of chlorination of the acetophenone or acetonaphthone thioalkyl ether. X may vary from 1 to 3 and, hence, includes monochlorination, dichlorination and trichlorination reactions. Thus, when the thioalkyl ether compound is dichlorinated, $R^1$ becomes chlorine. When the thioalkyl ether compound is trichlorinated, $R^1$ becomes chlorine and R then becomes monochloroalkyl.

Specific examples of $R^3$ include phenyl, naphthyl, 4-phenylphenyl, 4-chlorophenyl, 3,4-dichlorophenyl, 2,5-dichlorophenyl, 2,4-dichlorophenyl, 2,3,4-trichlorophenyl, 2,4,5-trichlorophenyl, 2-methyl-5-chlorophenyl, 2,4,6-trimethylphenyl, 4 - phenoxyphenyl, 4 - (4 - chlorophenyl) phenyl, 4-chloronaphthyl, 4-bromophenyl and 4-fluorophenyl.

The acetophenone or acetonaphthone thioalkyl ether employed in the chlorination reaction may be readily prepared by reacting a chloro- or bromomethyl aromatic ketone with an alkyl mercaptan, e.g. methyl, ethyl, propyl or butyl mercaptan, in the presence of a base. This reaction may be represented by the following equation:

$$\text{HalCH}_2-\text{COR}^3+\text{R}^2\text{SNa} \rightarrow \text{R}^2\text{S}-\text{CH}_2-\text{COR}^3+\text{NaHal}$$

In the above equation, Hal is a member of the group consisting of chlorine and bromine, $R^2$ is an alkyl radical, and $R^3$ is an aromatic radical of the group consisting of phenyl, naphthyl and substituted derivatives thereof. The chlorination reaction is generally carried out by adding any suitable chlorinating agent, such as sulfuryl chloride or chlorine, with stirring and cooling to maintain the reaction temperature at about 10 to 20° C. After addition of the chlorinating agent, the reaction mixture is then held for about 1 to 2 hours at a temperature of about 80 to 90° C. Hydrogen chloride by-product formed during the reaction may be removed by any procedure known to those skilled in the art, preferably by placing the reaction mixture under reduced pressure.

A trialkyl phosphite, e.g. trimethyl, triethyl, tripropyl or tributyl phosphite, is then added to the reaction mixture containing chlorinated acetophenone or acetonaphthone thioalkyl ether with stirring and cooling to maintain the reaction temperature at about 40 to 65° C. If desired, the chlorinated thioalkyl ether may be isolated prior to reaction with phosphite, as by vacuum distillation. After addition of the phosphite, the reaction mixture is held for about 1 to 2 hours at a temperature of about 80 to 100° C. Alkyl chloride by-product formed during the reaction may be removed by any procedure known to those skilled in the art, preferably by placing the reaction mixture under reduced pressure.

Although the chlorinated thioalkyl ether and phosphite may be charged in molar proportions of 1 mol of ether to about 1.0 to 1.2 mols of phosphite, approximately equimolar proportions of the reactants are preferred.

The following examples are given for the purpose of illustrating the present invention but are not intended to be limiting on the scope thereof. In the examples, parts are by weight.

EXAMPLE 1

10.7 parts of 4-chloroacetophenone thioethyl ether were placed in a reaction vessel provided with a mechanical stirrer, reflux condenser and means for external cooling. 6.8 parts of sulfuryl chloride were added dropwise to the reaction vessel with stirring and cooling at a temperature of 10–20° C. After addition of the sulfuryl chloride, the reaction mixture was heated to 85°±5° C. and held there for about 2 hours, the last half hour being at reduced pressure to facilitate removal of by-product hydrogen chloride. 8.3 parts of triethyl phosphite were added dropwise to the reaction mixture with stirring and slight cooling to maintain the reaction temperature at about 45° C. The reaction mixture was then heated to 85°±5° C. and held there for about 2 hours, the last half hour being at reduced pressure to facilitate removal of byproduct ethyl chloride. A yield of 18 parts of an oil constituting the following vinyl phosphate compound was obtained:

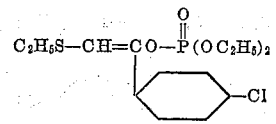

(Compound 1)

EXAMPLE 2

10 parts of 4-chloroacetophenone thiomethyl ether were reacted with 6.8 parts of sulfuryl chloride and then with 8.3 parts of triethyl phosphite using the procedure described in Example 1. 18 parts of an oil constituting the following vinyl phosphate compound were obtained:

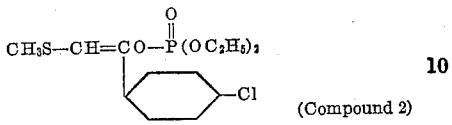
(Compound 2)

This compound was found to contain 9.5% phosphorus (theory—9.2%). Further, infrared analysis showed the presence of the vinyl group.

EXAMPLE 3

8.3 parts of acetophenone thiomethyl ether were placed in a reaction vessel provided with a mechanical stirrer, reflux condenser and means for external cooling. 6.8 parts of sulfuryl chloride were added dropwise to the reaction vessel with stirring and cooling at a temperature of 10–20° C. After addition of the sulfuryl chloride, the reaction mixture was heated to 85±5° C. and held for about 1 hour, the last quarter hour being at reduced pressure. After cooling the reaction mixture to 60±5° C. 6.2 parts of trimethyl phosphite were added dropwise to the reaction mixture with stirring. The reaction mixture was then heated to 85±5° C., and held there for about 1 hour, the last quarter hour being at reduced pressure. A yield of 13 parts of a brown oil constituting the following vinyl phosphate compound was obtained:

CH₃S—CH=CO—P(OCH₃)₂ (with phenyl)
(Compound 3)

EXAMPLE 4

9 parts of acetophenone thioethyl ether were reacted with 6.8 parts of sulfuryl chloride and then with 6.2 parts of trimethyl phosphite using the procedure described in Example 3. 14.5 parts of the following vinyl phosphate compound were obtained:

C₂H₅S—CH=CO—P(OCH₃)₂ (with phenyl)
(Compound 4)

EXAMPLE 5

11.8 parts of 3,4-dichloroacetophenone thiomethyl ether were reacted with 6.8 parts of sulfuryl chloride and then with 6.2 parts of trimethyl phosphite using the procedure described in Example 3. 17 parts of a brown oil constituting the following vinyl phosphate compound were obtained:

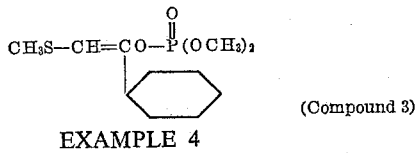
(Compound 5)

EXAMPLE 6

12.5 parts of 3,4-dichloroacetophenone thioethyl ether were reacted with 6.8 parts of sulfuryl chloride and then with 8.3 parts of triethyl phosphite using the procedure of Example 3. 18.5 parts of a brown oil constituting the following vinyl phosphate compound were obtained:

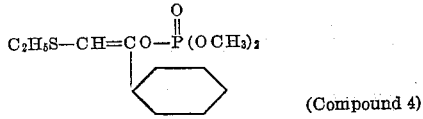
(Compound 6)

EXAMPLE 7

11.8 parts of 2,5-dichloroacetophenone thiomethyl ether were reacted with 6.8 parts of sulfuryl chloride and then with 6.2 parts of trimethyl phosphite using the procedure of Example 3. 17 parts of a brown oil constituting the following vinyl phosphate compound were obtained:

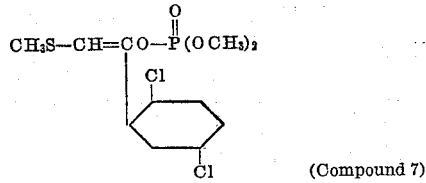
(Compound 7)

EXAMPLE 8

10.5 parts of 2,5-dichloroacetophenone thioethyl ether were reacted with 6.8 parts of sulfuryl chloride and then with 8.3 parts of triethyl phosphite using the procedure described in Example 3. 20 parts of a brown oil constituting the following vinyl phosphate compound were obtained:

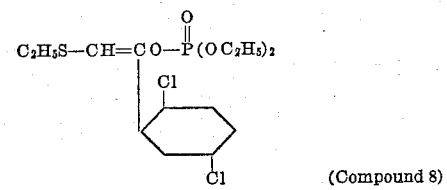
(Compound 8)

EXAMPLE 9

11.8 parts of 2,4-dichloroacetophenone thiomethyl ether were reacted with 6.8 parts of sulfuryl chloride and then with 6.2 parts of trimethyl phosphite using the procedure described in Example 3. A yield of 17 parts of a brown oil constituting the following vinyl phosphate compound was obtained:

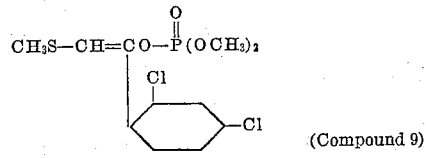
(Compound 9)

EXAMPLE 10

9 parts of 2,3,4-trichloroacetophenone thiomethyl ether were reacted with 4.6 parts of sulfuryl chloride and then with 5.5 parts of triethyl phosphite using the procedure described in Example 3. A yield of 13 parts of a brown oil constituting the following vinyl phosphate compound was obtained:

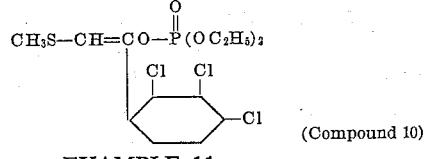
(Compound 10)

EXAMPLE 11

9.5 parts of 2,3,4-trichloroacetophenone thioethyl ether were reacted with 4.6 parts of sulfuryl chloride and then with 4.1 parts of trimethyl phosphite using the procedure described in Example 3. A yield of 13 parts of a brown oil constituting the following vinyl phosphate compound was obtained:

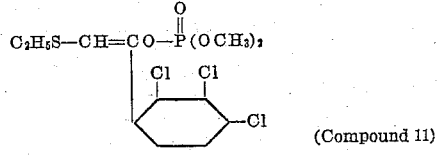
(Compound 11)

EXAMPLE 12

9 parts of 2,4,5-trichloroacetophenone thiomethyl ether were reacted with 4.6 parts of sulfuryl chloride and then with 5.5 parts of triethyl phosphite using the procedure described in Example 3. A yield of 13.5 parts of a brown oil constituting the following vinyl phosphate compound was obtained:

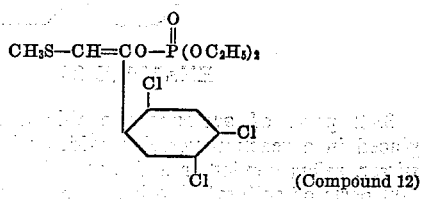
(Compound 12)

EXAMPLE 13

9.5 parts of 2,4,5-trichloroacetophenone thioethyl ether were reacted with 4.6 parts of sulfuryl chloride and then with 4.1 parts of trimethyl phosphite using the procedure described in Example 3. A yield of 13 parts of a brown oil constituting the following vinyl phosphate compound was obtained:

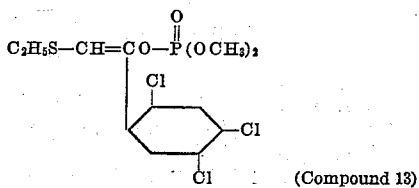
(Compound 13)

EXAMPLE 14

10.7 parts of 2-methyl-5-chloroacetophenone thiomethyl ether were reacted with 6.8 parts of sulfuryl chloride and then with 8.3 parts of triethyl phosphite using the procedure described in Example 3. A yield of 17 parts of a brown oil constituting the following vinyl phosphate compound was obtained:

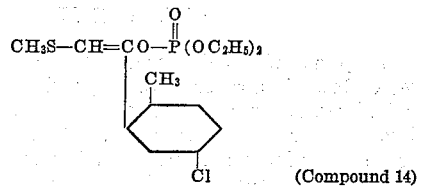
(Compound 14)

EXAMPLE 15

10.5 parts of 2,4,6-trimethylacetophenone thiomethyl ether were reacted with 6.8 parts of sulfuryl chloride and then with 6.2 parts of trimethyl phosphite using the procedure described in Example 3. A yield of 15 parts of a black oil constituting the following vinyl phosphate compound was obtained:

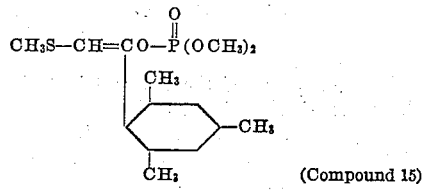
(Compound 15)

EXAMPLE 16

9.8 parts of 4-methoxyacetophenone thiomethyl ether were reacted with 6.8 parts of sulfuryl chloride and then with 6.2 parts of trimethyl phosphite using the procedure described in Example 3. A yield of 15 parts of a black oil constituting the following vinyl phosphate compound was obtained:

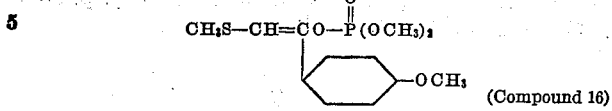
(Compound 16)

EXAMPLE 17

12.9 parts of 4-phenoxyacetophenone thiomethyl ether were reacted with 6.8 parts of sulfuryl chloride and then with 8.3 parts of triethyl phosphite using the procedure described in Example 3. A yield of 18.5 parts of a black oil constituting the following vinyl phosphate compound was obtained:

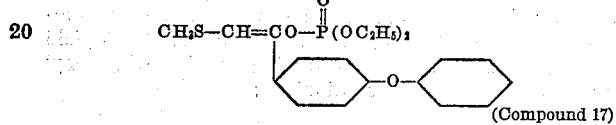
(Compound 17)

EXAMPLE 18

11.6 parts of 4-phenylacetophenone thiomethyl ether were reacted with 6.8 parts of sulfuryl chloride and then with 6.2 parts of trimethyl phosphite using the procedure described in Example 3. A yield of 16.5 parts of a brown oil constituting the following vinyl phosphate compound was obtained:

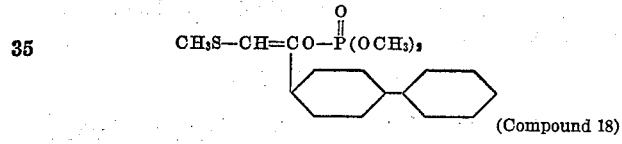
(Compound 18)

EXAMPLE 19

8.3 parts of 4-chloroacetonaphthone thiomethyl ether were reacted with 4.6 parts of sulfuryl chloride and then with 5.5 parts of triethyl phosphite using the procedure described in Example 3. A yield of 13 parts of a dark oil constituting the following vinyl phosphate compound was obtained:

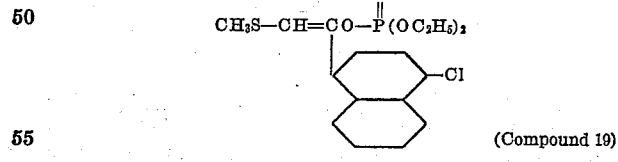
(Compound 19)

EXAMPLE 20

13.3 parts of 4-(4-chlorophenyl) acetophenone thiomethyl ether were reacted with 6.8 parts of sulfuryl chloride and then with 8.3 parts of triethyl phosphite using the procedure described in Example 3. A yield of 18.5 parts of the following vinyl phosphate compound was obtained:

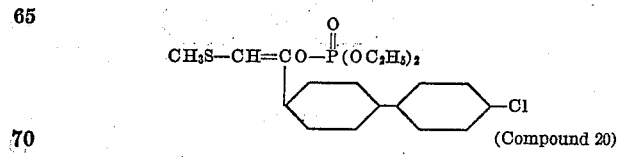
(Compound 20)

EXAMPLE 21

8.3 parts of acetophenone thiomethyl ether were reacted with 13.5 parts of sulfuryl chloride and then with 8.3 parts of triethyl phosphite using the procedure described in Example 3. The mol ratio of sulfuryl chloride to thiomethyl ether reactant was about 2:1. A yield of 16 parts of an oil constituting the following vinyl phosphate compound was obtained:

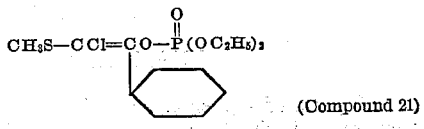

(Compound 21)

EXAMPLE 22

8.3 parts of acetophenone thiomethyl ether were reacted with 13.5 parts of sulfuryl chloride and then with 6.2 parts of trimethyl phosphite using the procedure described in Example 3. The mol ratio of sulfuryl chloride to thiomethyl ether reactant was about 2:1. A yield of 14.5 parts of an oil constituting the following vinyl phosphate compound was obtained:

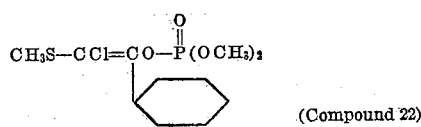

(Compound 22)

This compound was found to contain 10.2% phosphorus (theory—10%) and 10.1% sulfur (theory—10.4%). Further, infrared analysis showed the presence of the vinyl group.

EXAMPLE 23

9 parts of acetophenone thioethyl ether were reacted with 13.5 parts of sulfuryl chloride and then with 8.3 parts of triethyl phosphite using the procedure described in Example 3. The mol ratio of sulfuryl chloride to thioethyl ether reactant was about 2:1. A yield of 18 parts of the following vinyl phosphate compound was obtained.

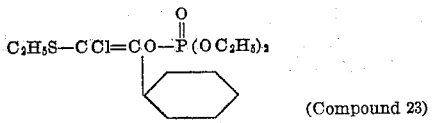

(Compound 23)

EXAMPLE 24

12.9 parts of 4-phenoxyacetophenone thiomethyl ether were reacted with 13.5 parts of sulfuryl chloride and then with 8.3 parts of triethyl phosphite using the procedure described in Example 3. The mol ratio of sulfuryl chloride to thiomethyl ether reactant was about 2:1. A yield of 21 parts of the following vinyl phosphate compound was obtained:

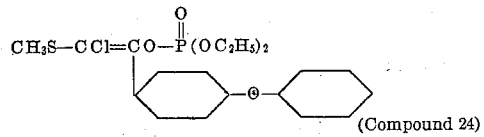

(Compound 24)

EXAMPLE 25

11.6 parts of 4-phenylacetophenone thiomethyl ether were reacted with 13.5 parts of sulfuryl chloride and then with 8.3 parts of triethyl phosphite using the procedure described in Example 3. The mol ratio of sulfuryl chloride to thiomethyl ether reactant was about 2:1. A yield of 20 parts of the following vinyl phosphate compound was obtained:

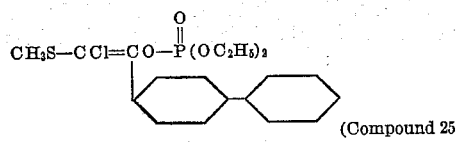

(Compound 25)

EXAMPLE 26

33.2 parts of acetophenone thiomethyl ether were placed in a reaction vessel provided with a mechanical stirrer, reflux condenser and means for external cooling. 108 parts of sulfuryl chloride were slowly added to the reaction vessel with stirring and cooling during addition of about one-half of the sulfuryl chloride. As gas evolution abated, the reaction mixture was warmed, and sulfuryl chloride refluxed. The temperature rose slowly to about 90° C. in one-half hour, and reflux stopped. The reaction mixture was then heated for 2 hours at about 90–100° C., and reduced pressure was applied. A yield of 52 parts of the following trichlorinated compound was obtained:

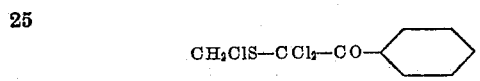

To 13.5 parts of the above trichlorinated compound, 8.3 parts of triethyl phosphite were added dropwise with stirring. The reaction mixture was then heated to 85°±5° C. and held there for about 1 hour, the last quarter hour being at reduced pressure. A yield of 18 parts of the following vinyl phosphate compound was obtained:

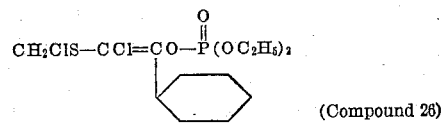

(Compound 26)

EXAMPLE 27

40 parts of 4-chloroacetophenone thiomethyl ether were placed in a reaction vessel provided with a mechanical stirrer, reflux condenser and means for external cooling. 81 parts of sulfuryl chloride were slowly added to the reaction vessel with stirring and cooling during addition of about one-half of the sulfuryl chloride. As gas evolution abated, the mixture was warmed, and sulfuryl chloride refluxed. The temperature rose slowly to about 90° C. in one-half hour, and reflux stopped. The reaction mixture was then heated for 2 hours at about 90–100° C., and reduced pressure was applied. A yield of 57 parts of the following trichlorinated compound was obtained:

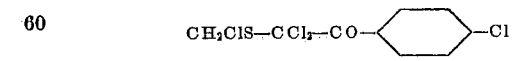

To 13.5 parts of the above trichlorinated compound, 8.3 parts of triethyl phosphite were added dropwise with stirring. The reaction mixture was then heated to 85° ±5° C. and held there for about 1 hour, the last quarter hour being at reduced pressure. A yield of 19 parts of the following vinyl phosphate compound was obtained:

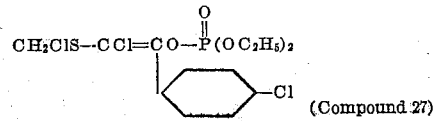

(Compound 27)

EXAMPLE 28

To 13.5 parts of the trichlorinated compound prepared in Example 27, 6.2 parts of trimethyl phosphite were added dropwise to the reaction mixture with stirring. The reaction mixture was then heated to 85°±5° C. and held there for about 1 hour, the last quarter hour being at reduced pressure. A yield of 17 parts of the following vinyl phosphate compound was obtained:

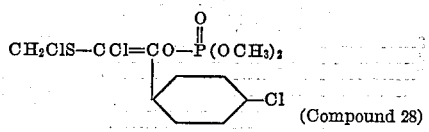

(Compound 28)

EXAMPLE 29

11.8 parts of 2,5-dichloroacetophenone thiomethyl ether were reacted with 13.5 parts of sulfuryl chloride and then with 6.2 parts of trimethyl phosphite using the procedure described in Example 3. The mol ratio of sulfuryl chloride to thiomethyl ether reactant was about 2:1. A yield of 19 parts of the following vinyl phosphate compound was obtained:

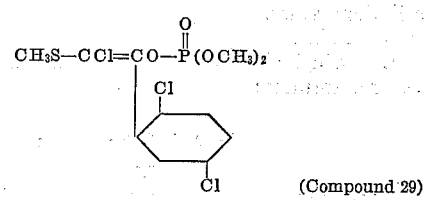

(Compound 29)

EXAMPLE 30

11.8 parts of 3,4-dichloroacetophenone thiomethyl ether were reacted with 13.5 parts of sulfuryl chloride and then with 8.3 parts of triethyl phosphite using the procedure described in Example 3. The mol ratio of sulfuryl chloride to thiomethyl ether reactant was about 2:1. A yield of 20 parts of the following vinyl phosphate compound was obtained:

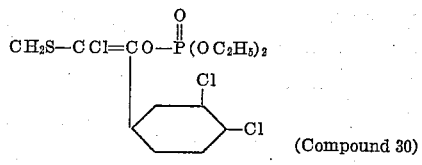

(Compound 30)

EXAMPLE 31

13.5 parts of 2,4,5-trichloroacetophenone thiomethyl ether were reacted with 13.5 parts of sulfuryl chloride and then with 8.3 parts of triethyl phosphite using the procedure described in Example 3. The mol ratio of sulfuryl chloride to thiomethyl ether reactant was about 2:1. A yield of 22 parts of the following vinyl phosphate compound was obtained:

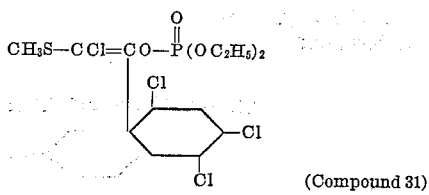

(Compound 31)

EXAMPLE 32

13 parts of 4-bromoacetophenone thioethyl ether were reacted with 20.2 parts of sulfuryl chloride and then with 6.2 parts of trimethyl phosphite using the procedure described in Example 3. The mol ratio of sulfuryl chloride to thioethyl ether reactant was about 3:1. A yield of 20 parts of the following vinyl phosphate compound was obtained:

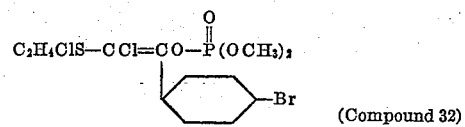

(Compound 32)

EXAMPLE 33

9.7 parts of 4-fluoroacetophenone thiomethyl ether were reacted with 13.5 parts of sulfuryl chloride and then with 8.3 parts of triethyl phosphite using the procedure described in Example 3. The mol ratio of sulfuryl chloride to thiomethyl ether reactant was about 2:1. A yield of 18 parts of the following vinyl phosphate compound was obtained:

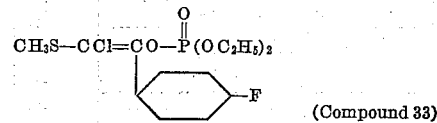

(Compound 33)

The vinyl phosphate compounds of this invention are ordinarily applied as toxicants for combating pests, particularly insects and mites, in conjunction with a carrier which may be a solid, liquid or gaseous material, the invention compounds constituting the toxic ingredients of such compositions. The vinyl phosphate compounds may be employed either in the form of aqueous sprays or dust compositions and the amount of toxicant used may vary, a sufficient quantity being used to provide the desired toxicity.

When employed in the form of a powder or dust for killing pests, the vinyl phosphate compounds or toxicants may be mixed with a substantial proportion of any suitable inert material or diluent, preferably in finely divided form, such as known grades of prepared paraciticide carrier clays, pyrophyllite, fuller's earth, bentonite, sulfur, lime, talc, whiting, diatomaceous earth, etc. Suitable dusts of this type usually contain not less than 1% and preferably not less than 3% by weight of toxicant.

Liquid pesticide sprays containing the toxicants of this invention may be prepared by first forming a solution of the compound in a suitable organic solvent, e.g., xylene, methylated naphthalenes or any highly aromatic petroleum-type paraciticide oil, and preferably adding a small amount of emulsifying agent commonly employed in the art, such as diglycol oleate or p-isooctyl phenyl ether of polyethylene glycol. The resulting concentrate solution is incorporated with water in quantity sufficient to form an aqueous dispersion or emulsion having the desired active ingredient concentration.

In a preferred embodiment, aqueous spray dispersions or emulsions may be formed by incorporating in water dry mixtures or so-called wettable spray powders containing the vinyl phosphate compounds of the invention. These mixtures may also include inert diluents, suitable quantities of wetting and dispersing agents and, if desired, secondary toxicants.

The aqueous spray dispersions of the invention preferably should contain the active ingredient in an amount not less than 1/16 of a pound per hundred gallons of spray, the more usual concentrations being in the range of 0.15 to 0.50 of a pound per hundred gallons of spray.

Many of the vinyl phosphate compounds of this invention are not only effective as contact toxicants but are also extremely toxic when used as systemic toxicants for killing pests which invade plants. In such use, the toxicant, with or without a suitable carrier or diluent, can be applied to soil in the vicinity of the growing plant to be protected, the toxicant being absorbed by the plant. Alternatively, the toxicant can be applied directly to portions of the plant where it is again absorbed and distributed throughout the plant tissues, including portions not directly treated. In either case, the whole plant then becomes toxic to pests which feed on it.

Following Table 1 contains the results of tests relating to use of a number of typical vinyl phosphate compounds of the invention as contact pesticides:

*Table 1*

| Vinyl Phosphate Compound | Formulation (parts by volume) | Mites [a] (percent kill) | Pea Aphids [b] (percent kill) | Mexican Bean Beetle Larvae [c] (percent kill) | House-flies [d] (percent kill) |
|---|---|---|---|---|---|
| 1 | 1 part vinyl phosphate composition [1] per 79 parts water. | 100 | 100 | 100 | 70 |
| 2 | ----do---- | 100 | 100 | 100 | 91.9 |
| 1 | 1/16 of a pint vinyl phosphate composition [2] per 100 gallons of water. | | 95 | 100 | |
| 2 | ----do---- | | 100 | 100 | |
| 3 | 1 part vinyl phosphate composition [1] per 79 parts water.* | 100 | 100 | 100 | 98.3 |
| 4 | ----do---- | 100 | 100 | 100 | 100 |
| 5 | ----do---- | 100 | 100 | 100 | 89.6 |
| 6 | ----do---- | 100 | 100 | 100 | 81.1 |
| 7 | ----do---- | 100 | 100 | 100 | 98.4 |
| 8 | ----do---- | 100 | 100 | 100 | 88.7 |
| 9 | ----do---- | 100 | 100 | 100 | 100 |
| 10 | ----do---- | 100 | 100 | 100 | 96.9 |
| 11 | ----do---- | 100 | 100 | 100 | 100 |
| 12 | ----do---- | 100 | 100 | 100 | 100 |
| 13 | ----do---- | 100 | 100 | 100 | 100 |
| 14 | ----do---- | 100 | 100 | 100 | 96.5 |
| 15 | ----do---- | 100 | 75 | 90 | |
| 17 | ----do---- | 100 | 100 | 100 | |
| 18 | ----do---- | | 100 | 90 | |
| 19 | ----do---- | 90.5 | 75 | 70 | |
| 21 | ----do---- | 100 | 100 | 100 | 100 |
| 22 | ----do---- | 100 | 100 | 100 | 100 |
| 23 | ----do---- | 100 | 100 | 90 | 100 |
| 24 | ----do---- | 100 | 80 | 90 | |
| 25 | ----do---- | 100 | | 100 | |
| 26 | ----do---- | 100 | 100 | 100 | 96.1 |
| 27 | ----do---- | 100 | 100 | 100 | 98 |
| 28 | ----do---- | 100 | 100 | 100 | 98.1 |
| 29 | 1 part vinyl phosphate composition [1] per 639 parts water. | | | 100 | |
| 30 | ----do---- | | | 100 | |
| 31 | ----do---- | | | 90 | |

[1] 4.8 grams of vinyl phosphate compound dissolved in acetone to 100 cc.
[2] Vinyl phosphate compositions in the form of 25% emulsible concentrates comprising 70% cyclohexanone, 5% "Triton X-155" (p-isooctylphenyl ether of polyethylene glycol).
* In tests on toxicity to house flies, 79 parts of a sugar solution (20 pounds of sugar dissolved in water to 100 gallons) were used.
[a] The mite tests were run on "red spider" (*Tetranychus telarius*) by spraying the indicated formulation onto horticultural (cranberry) bean plants infested with the mites. Following treatment, the plants were stored on racks on irrigated trays in a greenhouse. Observations on kill were made 3 days after treatment.
[b] The tests on toxicity to pea aphids (*Macrosiphum pisi*) were run by removing the pea aphids from infested broad bean plants, placing them on a wire screen and spraying them with the indicated formulation. Following treatment, the pea aphids were confined to untreated broad bean plants. Record of kill was made 3 days after treatment.
[c] The tests on toxicity to Mexican bean beetle larvae (*Epilachna varivestis*) were run by spraying horticultural (cranberry) bean plants with the indicated formulation and allowing the plants to dry. The larvae were confined to the treated foliage by means of wire cages. Record of kill was made 3 days after treatment.
[d] The tests on toxicity to house flies (*Musca domestica*) were run by spraying the indicated formulation onto glass plates and allowing them to dry. The flies were confined over the plates by means of screen wire hemispheres, moisture and food being provided in the form of balls of "Cellucotton" (an absorbent cellulose composition resembling cotton) soaked in water-sugar solution. Percentage kill was recorded 24 hours after confinement.

Following Table 2 illustrates systemic pesticide activity of some of the vinyl phosphate compounds coming within the scope of this invention. The tests were run by mixing 20 cc. of the indicated formulation with soil (170 gms. dry weight) in a flowerpot containing horticultural (cranberry) bean plants. One day later the plant foliage was infested with the pest, and kills were noted three days after infestation.

*Table 2*

| Vinyl Phosphate Compound | Formulation (parts by volume) | Mites (Percent kill) | Pea Aphids (Percent kill) | Mexican Bean Beetle Larvae (Percent kill) |
|---|---|---|---|---|
| 2 | 1 part vinyl phosphate composition [1] in 79 parts of water. | 90 | | |
| 3 | ----do---- | 100 | 100 | |
| 4 | ----do---- | 100 | 100 | |
| 7 | ----do---- | 100 | | |
| 9 | ----do---- | 100 | | |
| 15 | ----do---- | 100 | | |
| 16 | ----do---- | 100 | | |
| 21 | ----do---- | | 100 | |
| 22 | ----do---- | 100 | 100 | |
| 23 | ----do---- | | 100 | |
| 29 | ----do---- | | | 100 |

[1] 4.8 grams of vinyl phosphate compound dissolved in acetone to 100 cc.

From the foregoing, it is apparent that we have discovered a series of novel and valuable compounds possessing outstanding value as insecticides and miticides.

Since various changes and modifications may be made in the invention without departing from the spirit thereof, it is intended that all matter contained in the above description shall be interpreted as illustrative and not in a limiting sense.

We claim:

1. A vinyl phosphate compound having the following general formula:

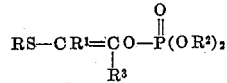

in which R is a member of the group consisting of lower alkyl and monochloroalkyl radicals, R¹ is a member of the group consisting of hydrogen and chlorine, R² is a lower alkyl radical, and R³ is an aromatic radical of the group consisting of phenyl, naphthyl and halo-, phenyl-, phenoxy- lower alkyl- and lower alkoxy-substituted derivatives thereof.

2. A vinyl phosphate compound having the following general formula:

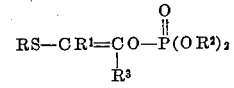

in which R and R² are alkyl radicals containing from one to four carbon atoms, R¹ is a member of the group consisting of hydrogen and chlorine, and R³ is an aromatic radical of the group consisting of phenyl, naphthyl and halo-, phenyl-, phenoxy-, lower alkyl- and lower alkoxy-substituted derivatives thereof.

3. A vinyl phosphate compound having the following general formula:

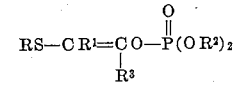

in which R is a member of the group consisting of alkyl and monochloroalkyl radicals containing from one to four carbon atoms, R¹ is chlorine, R² is an alkyl radical containing from one to four carbon atoms, and R³ is an aromatic radical of the group consisting of phenyl, naphthyl and halo-, phenyl-, phenoxy-, lower alkyl- and lower alkoxy-substituted derivatives thereof.

4. The vinyl phosphate compound having the following formula:

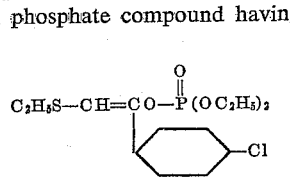

5. The vinyl phosphate compound having the following formula:

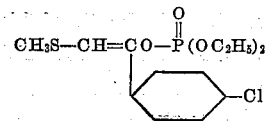

6. The vinyl phosphate compound having the following formula:

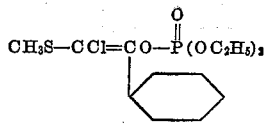

7. The vinyl phosphate compound having the following formula:

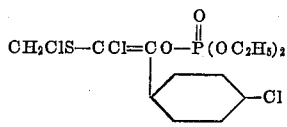

8. The vinyl phosphate compound having the following formula:

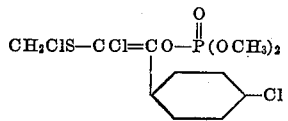

9. The method of preparing a vinyl phosphate compound having the following general formula:

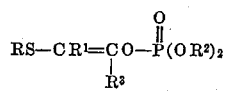

in which R is a member of the group consisting of lower alkyl and monochloroalkyl radicals, $R^1$ is a member of the group consisting of hydrogen and chlorine, $R^2$ is a lower alkyl radical and $R^3$ is an aromatic radical of the group consisting of phenyl, naphthyl and halo-, phenyl-, phenoxy-, lower alkyl- and lower alkoxy-substituted derivatives thereof, which comprises reacting a thioalkyl ether having the following general formula:

$$R^2S—CH_2—COR^3$$

in which $R^2$ is a lower alkyl radical and $R^3$ is an aromatic radical of the group consisting of phenyl, naphthyl and halo-, phenyl-, phenoxy-, lower alkyl- and lower alkoxy-substituted derivatives thereof, with a chlorinating agent, thereby forming a chlorinated thioalkyl ether and then reacting said chlorinated thioalkyl ether with a lower trialkyl phosphite.

10. Pesticidal compositions comprising a vinyl phosphate compound having the following general formula:

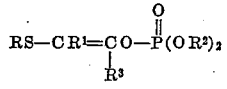

in which R is a member of the group consisting of lower alkyl and monochloroalkyl radicals, $R^1$ is a member of the group consisting of hydrogen and chlorine, $R^2$ is a lower alkyl radical, and $R^3$ is an aromatic radical of the group consisting of phenyl, naphthyl and halo-, phenyl-, phenoxy-, lower alkyl- and lower alkoxy-substitued derivatives thereof, together with a carrier therefor.

11. Pesticidal compositions comprising a vinyl phosphate compound having the following general formula:

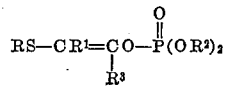

in which R and $R^2$ are alkyl radicals containing from one to four carbon atoms, $R^1$ is a member of the group consisting of hydrogen and chlorine, and $R^3$ is an aromatic radical of the group consisting of phenyl, naphthyl and halo-, phenyl-, phenoxy-, lower alkyl- and lower alkoxy-substituted derivatives thereof, together with a carrier therefor.

12. Pesticidal compositions comprising a vinyl phosphate compound having the following general formula:

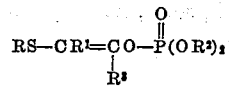

in which R is a member of the group consisting of alkyl and monochloroalkyl radicals containing from one to four carbon atoms, $R^1$ is chlorine, $R^2$ is an alkyl radical containing from one to four carbon atoms, and $R^3$ is an aromatic radical of the group consisting of phenyl, naphthyl and halo-, phenyl-, phenoxy-, lower alkyl- and lower alkoxy-substituted derivatives thereof, together with a carrier therefor.

13. Pesticidal compositions comprising the vinyl phosphate compound having the following formula:

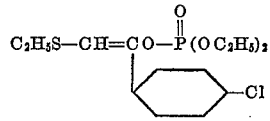

together with a carrier therefor.

14. Pesticidal compositions comprising the vinyl phosphate compound having the following formula:

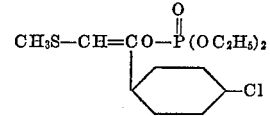

together with a carrier therefor.

15. Pesticidal compositions comprising the vinyl phosphate compound having the following formula:

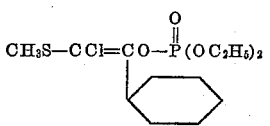

together with a carrier therefor.

16. Pesticidal compositions comprising the vinyl phosphate compound having the following formula:

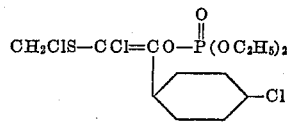

together with a carrier therefor.

17. Pesticidal compositions comprising the vinyl phosphate compound having the following formula:

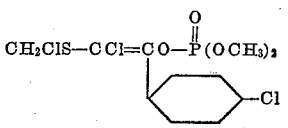

together with a carrier therefor.

18. The process of combating pests which comprises exposing said pests to the action of a pest-controlling composition comprising a vinyl phosphate compound having the following general formula:

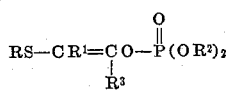

in which R is a member of the group consisting of lower alkyl and monochloroalkyl radicals, R¹ is a member of the group consisting of hydrogen and chlorine, R² is a lower alkyl radical, and R³ is an aromatic radical of the group consisting of phenyl, naphthyl and halo-, phenyl-, phenoxy-, lower alkyl- and lower alkoxy-substituted derivatives thereof.

References Cited in the file of this patent
UNITED STATES PATENTS

| | | |
|---|---|---|
| 2,116,893 | Heisel | May 10, 1938 |
| 2,431,285 | Suter et al. | Nov. 18, 1947 |

OTHER REFERENCES

Pudovik: "J. Gen. Chem. U.S.S.R." (English Trans.) 25, 2137–43 (November 1955).